(12) United States Patent
Razzell

(10) Patent No.: US 11,456,898 B2
(45) Date of Patent: Sep. 27, 2022

(54) LOW-POWER COMPLEX ANALOG LMS ADAPTATION SYSTEMS AND METHODS

(71) Applicant: Maxim Integrated Products, Inc., San Jose, CA (US)

(72) Inventor: Charles Razzell, Pleasanton, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 26 days.

(21) Appl. No.: 17/112,907

(22) Filed: Dec. 4, 2020

(65) Prior Publication Data

US 2021/0226823 A1 Jul. 22, 2021

Related U.S. Application Data

(60) Provisional application No. 62/963,854, filed on Jan. 21, 2020.

(51) Int. Cl.
*H04L 25/03* (2006.01)
*H04J 14/06* (2006.01)

(52) U.S. Cl.
CPC ........ *H04L 25/03031* (2013.01); *H04J 14/06* (2013.01); *H04L 25/03057* (2013.01); *H04L 2025/03643* (2013.01)

(58) Field of Classification Search
CPC .............. H04B 10/616; H04B 10/6161; H04B 10/6162; H04B 10/6165; H04B 10/079; H04B 10/40; H04B 10/615; H04B 10/6164; H04B 10/6166; H04L 1/0045; H04L 2025/03636; H04J 14/06; H03D 7/166

See application file for complete search history.

(56) References Cited

U.S. PATENT DOCUMENTS

| | | | | |
|---|---|---|---|---|
| 10,110,319 | B1 * | 10/2018 | Hueda | H04L 7/0058 |
| 2001/0014594 | A1 * | 8/2001 | Khlat | H04B 1/30 |
| | | | | 455/313 |
| 2015/0350002 | A1 * | 12/2015 | Jiao | H01Q 25/001 |
| | | | | 455/41.2 |
| 2019/0181962 | A1 * | 6/2019 | Ibragimov | H04B 10/6164 |

* cited by examiner

*Primary Examiner* — David S Huang
(74) *Attorney, Agent, or Firm* — North Weber & Baugh LLP; Michael North

(57) ABSTRACT

LMS adaption systems and methods disclosed herein adaptively switch between modes of operation that selectively avoid using the imaginary part of an error signal, in effect, allowing for an LMS adaption that switches between utilizing only the real part of the error signal and utilizing the full complex error signal. Various embodiments take advantage of this added flexibility by implementing a dynamic power saving scheme that, for example, during times when high tracking performance (e.g., high accuracy or high SNR) is not needed, saves power by not energizing a number of multiplier and adder circuits that are expensive in terms of power consumption, thereby, trading power savings for a possible temporary reduction in tracking performance. In embodiments, power savings are accomplished by adaptive power-gating systems and methods that in parts of an analog LMS adaption circuit turn on and off current sources in analog multiplier circuits on demand.

20 Claims, 6 Drawing Sheets

LOW-POWER COMPLEX ANALOG LMS ADAPTATION SYSTEMS AND METHODS

CROSS REFERENCE TO RELATED PATENT APPLICATIONS

This application is related to and claims the priority benefit, under 35 U.S.C. § 119(e), from U.S. Provisional Patent Application, Ser. No. 62/963,854 entitled "Low-Power Complex Analog LMS Adaptation Systems and Methods," filed on Jan. 21, 2020 and listing as inventor Charles Razzell. Each reference mentioned in this patent document is incorporated by reference herein in its entirety and for all purposes.

BACKGROUND

The present disclosure relates generally to signal processing in high-speed telecommunication circuits. More particularly, the present disclosure relates to systems and methods for reducing power consumption in dual-polarization coherent optical transmission and similar applications.

In the past few decades, telecommunication networks have seen an ever-increasing demand for bandwidth. Large available bandwidth is a major factor in the increasing popularity of high-speed optical communication systems—whether for transferring data from chip-to-chip or between Wide Area Network (WAN) fiber-optic links. For example, optical transceivers designed for short-distance (e.g., a few hundred meters) interconnects over optical fiber are in high demand in data center and campus networks.

Coherent optical links communicate data over different channels that correspond to different phases and polarization states of the signal that enters the optical fiber. While transmitted data typically are aligned relative to a common clock, delays are introduced into the channels due to imperfections that are inherent to the transmitter, the receiver, and the optical fiber itself, such that polarization and phase in the various channels arrive at the receiver with unknown rotation in phase and polarization dimensions, which are inverted to recover the transmitted data.

As has been disclosed in various patent applications mentioned herein and incorporated by reference, existing electronic polarization control loops separate and phase-align dual polarization coherent signals. Least mean square (LMS) adaption is used in a coherent optical signal processor to track random phase rotations and other impairments. Since the Jones matrix representation of the fiber plant and its inverse uses complex coefficients, various complex LMS adaption systems and methods disclosed in U.S. Patent Application No. 62/931,122, filed on Nov. 5, 2019, entitled "Analog Coherent Signal Processing Systems and Methods," listing as inventors Charles Razzell and Edem Ibragimov, may be advantageously used to efficiently track carrier phase and polarization states using purely analog-domain methods. However, the number of analog multipliers required to fully implement such a scheme may be considered as onerous from a power consumption point of view.

Accordingly, it is desirable to simplify existing complex analog coherent signal processing systems and methods to reduce their power consumption.

BRIEF DESCRIPTION OF THE DRAWINGS

References will be made to embodiments of the disclosure, examples of which may be illustrated in the accompanying figures. These figures are intended to be illustrative and not limiting. Although the accompanying disclosure is generally described in the context of these embodiments, it should be understood that it is not intended to limit the scope of the disclosure to these particular embodiments.

DETAILED DESCRIPTION OF THE PREFERRED EMBODIMENTS

Figure 1:
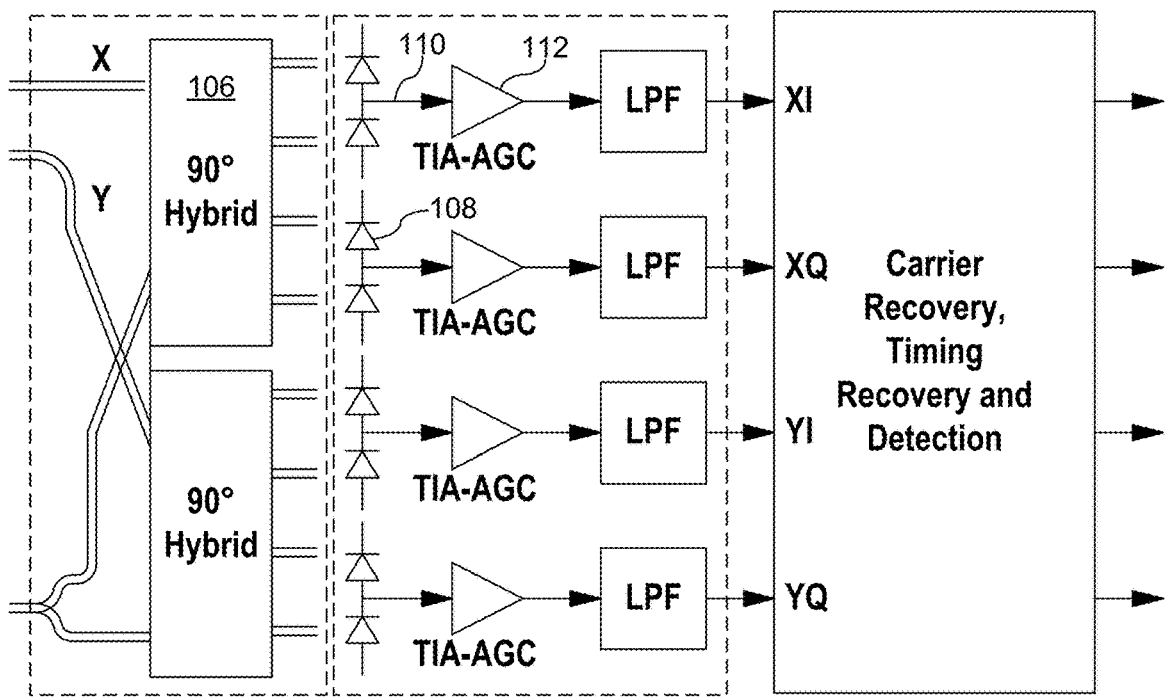
FIG. 1 is a block diagram of a conventional dual polarization quaternary amplitude modulation (DP-QAM) receiver architecture based on analog signal processing.

In the following description, for purposes of explanation, specific details are set forth in order to provide an understanding of the disclosure. It will be apparent to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units. Those skilled in the art will recognize that various components or portions thereof may be divided into separate components or may be integrated, e.g., within a single system or component. It should be noted that functions or operations discussed herein may be implemented as components. Such components may be implemented in software, hardware, or any combination thereof.

Connections between components or systems within the figures are not intended to be limited to direct connections. Rather, data between these components may be modified, re-formatted, or otherwise changed by intermediary components. Further, additional or fewer connections may be used. It is noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, appearances of the above-noted phrases in various places in the specification are not necessarily all referring to the same embodiment or embodiments.

The use of certain terms in various places in the specification is for illustration and should not be construed as limiting. For example, the terms "include," "including," "comprise," and "comprising" shall be understood to be open terms and any lists that follow are examples and not meant to be limited to the listed items.

Any headings used herein are for organizational purposes only and shall not be used to limit the scope of the description, which includes the claims. All documents cited herein are incorporated by reference herein in their entirety.

In this document the term "tap weights" refers to weights, states, coefficients, or gains of filter taps. Adding includes subtracting and any type of comparison, e.g., using a comparator circuit.

A. Overview

Although embodiments described herein are given in the context of optical communication systems and methods, a person skilled in the art will recognize that the teachings of the present disclosure are not limited to optical communication applications and may equally be used in wired networks, satellite communication, and the like.

Coherent optical links communicate data over different communication channels that correspond to different phases and polarizations of an input signal to the fiber. In a dual-polarization coherent optical transmission system, X- and Y-polarization channels, ideally, carry independent in-phase (I) and quadrature phases (Q) of the X- and Y-polarizations, conventionally denoted as tributaries XI, XQ, YI, and YQ (one for each branch), such that when level 4 pulse-amplitude modulation (4-PAM) is employed, each receiver branch yields two bits for every unit interval (UI), and the combination of all four branches yields a total of 8 bits per UI.

FIG. 1 is a block diagram of a conventional DP-QAM receiver architecture that is based on analog signal processing. Receiver 100 is a homodyne receiver driven by an on-channel laser (not shown) that acts as a local oscillator. The arrangement of the polarization beam splitter and 90° hybrids 106 provides balanced quadrature light outputs for each of the two orthogonal polarizations, labeled X and Y, which are incident on eight photodiodes 108 arranged in balanced pairs. Such arrangement results in four bipolar photocurrents 110 that are amplified by respective Trans Impedance Amplifiers (TIAs) 112, corresponding to I- and Q-phases of the X- and Y-polarizations, respectively. Thus, four branches of receiver 100, i.e., XI, XQ, YI, and YQ, are available for further signal processing in the analog domain.

LMS adaption is performed using a continuous version of the classic RLMS update equation on eight coefficients that maybe held, for example, in analog integrators as charge on capacitors. The eight coefficients represent a 2×2 complex matrix that is used to separate and phase correct the incoming analog signal:

$$\begin{bmatrix} E_{XO} \\ E_{YO} \end{bmatrix} = \begin{bmatrix} C_{1X} & C_{1Y} \\ C_{2X} & C_{2Y} \end{bmatrix} \cdot \begin{bmatrix} E_{XI} \\ E_{YI} \end{bmatrix}$$

B. Top-Level View

Figure 2:
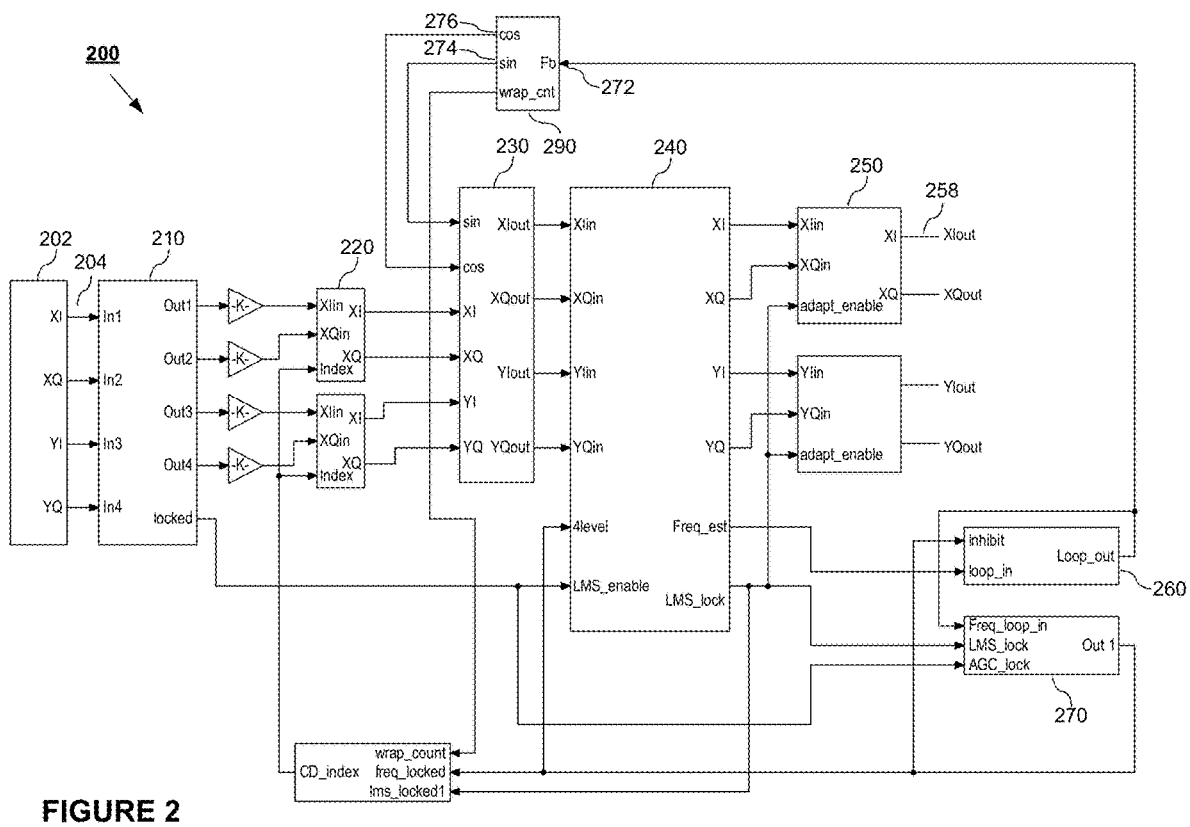
FIG. 2 is a top-level view of an exemplary analog coherent signal processing engine (ACE) that comprises an LMS polarization tracking circuit according to various embodiments of the present disclosure.

FIG. 2 illustrates a top-level view of an exemplary ACE comprising an LMS polarization tracking circuit according to various embodiments of the present disclosure. ACE 200 comprises receiver input 202, automatic gain control (AGC) 210, front end equalizer (FEE) 220, carrier frequency offset (CFO) 230, polarization and carrier phase correction circuit 240, back-end equalizer (BEE) 250, Frequency sweep generator 260, AFC lock detect circuit 270, and digitally controlled oscillator (DCO) 290.

In embodiments, receiver input 202 receives four electrical signals that represent respective receiver branches 204 XI, XQ, YI, and YQ that may be the outputs of differential TIAs that, similar to FIG. 1, monitor four pairs of photodiodes (not shown in FIG. 2). AGC 210 may be a 4-channel AGC that normalizes signal levels for further processing. Automatic gain control may be performed independently in each receiver branch (e.g., 204) using a control loop that strives to achieve a set point for the RMS output voltage. An AGC lock detect signal may be provided as the "AND" of the lock detects for all four receiver branches (e.g., 204). Further, deglitching logic may be utilized to prevent multiple lock/unlock events during the final stages of loop settling.

In embodiments, FEE 220 may be used to reduce or eliminate CD, ISI, and receiver skew. FEE 220 may be implemented as an analog FEE, e.g., one for X and one for Y, that utilizes a set of tap weights to cause down-stream receiver loops to correctly lock. Tap weights may be set using a look-up table that specifies a set of suitable FIR coefficients. In embodiments, four independently determined coefficient vectors may be used instead of two, which normally suffices for complex coefficients.

In embodiments, CFO 230 correction or cancellation multiplies respective X- and Y-branches with a complex local oscillator signal provided on sin 274 and cos 274 input ports. In embodiments, BEE 250 may use a pulse amplitude modulation 4-PAM decision-based error signal to train an iterative analog complex LMS with five complex taps. BEE 250 may perform residual ISI correction by inverse filtering the low-pass filtering effect caused by amplifier parasitics. In embodiments, BEE 250 correct for loss of fidelity by adaptively finding the transfer function that results in the least error between the 4-PAM signal points. A gain block in the error feedback loop (not shown) may be used to adjust the speed of adaption. The output of BEE 250 are corrected 4-PAM signals that may be fed into an ADC (not shown) to obtain desired symbols.

In embodiments, various circuit elements may provide control and/or supervisory functions for loop control. For example, DCO 290 may generate a quadrature local oscillator having a frequency defined by the output of a loop filter (not shown) that operates on the control loop feedback signal at input port "Fb" 272. The integrator within the loop filter may be programmed to wrap once it reaches either extreme of a frequency offset range, such as to allow for continuous linear ramp scanning of possible offset frequencies between transmitter and receiver lasers. Once the loop filter state wraps around from positive to negative frequency offsets or vice versa, a counter may be incremented and provided on an output port. Once the counter is incremented, the chromatic dispersion (CD) compensation range may be incremented in several km steps to find a CD compensation value that enables a frequency lock.

AFC lock detect circuit 270 may indicate that the frequency is in lockable range, e.g., by monitoring the control loop of CFO 230 and determining when the rate of change of frequency crosses a zero value. Circuit 270 may further indicate that the continuous scanning of possible offset frequencies should be suspended for a predetermined time. Logic may be provided to prevent an indication of a stable frequency loop from being asserted too soon after AGC 210 has locked to prevent a premature frequency lock determination. If LMS loop lock detect is true, this may override the frequency lock detection function since LMS loop cannot achieve phase lock unless frequency lock has been achieved. This allows the monostable to expire without any impact to the status of frequency lock, thus, allowing the LMS loop to achieve lock during the monostable time period.

In embodiments, frequency sweep generator 260 controls frequency sweeps, e.g., by combining the output of the LMS frequency offset detector with an internally generated constant signal that biases the control loop feedback signal, e.g., to enable wide-band frequency offset scanning at power-up or after frequency lock has been lost. Polarization and carrier phase correction circuit 240 is described next with reference to FIG. 3.

Figure 3:
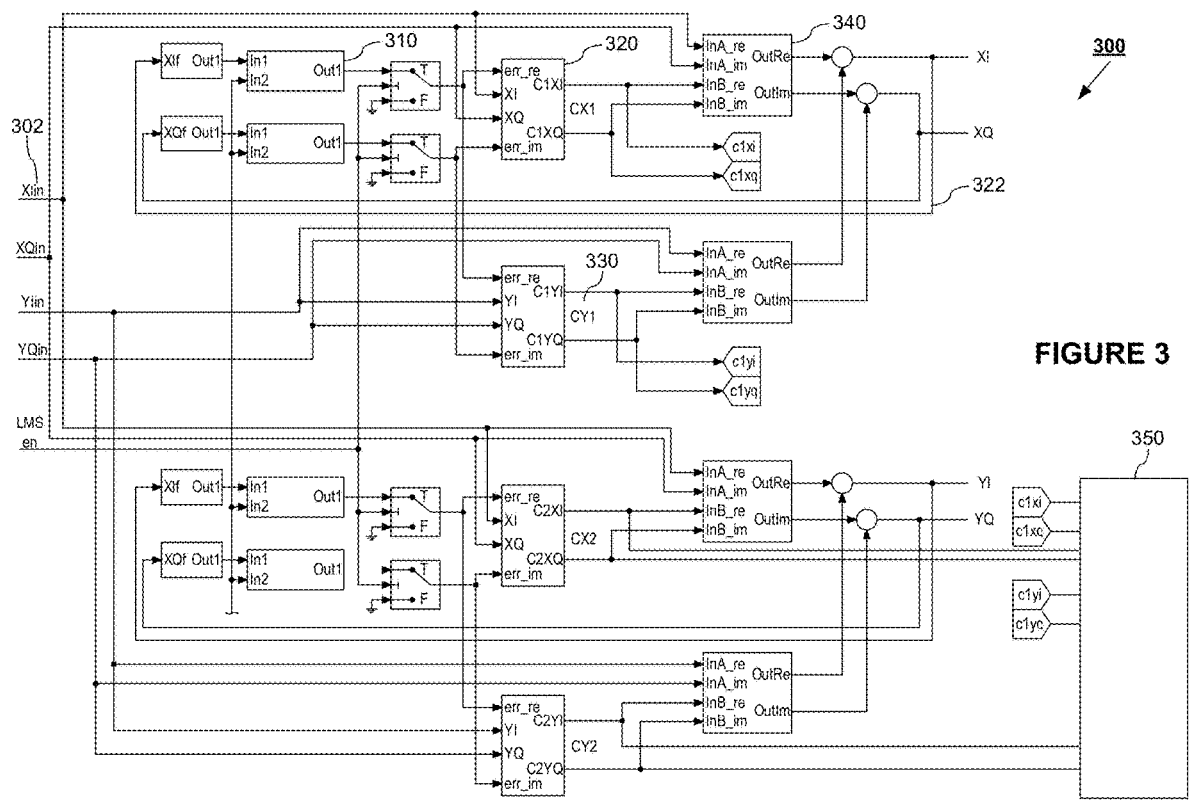
FIG. 3 shows an LMS polarization tacking circuit comprising four exemplary adaption circuits, according to embodiments of the present disclosure.

FIG. 3 illustrates an LMS polarization tacking circuit comprising four exemplary adaption circuits according to embodiments of the present disclosure. LMS polarization tacking circuit 300 comprises error slicers (e.g., 310), adaption circuits (e.g., 320), complex multipliers (e.g., 340), and supervisory control circuit 350. Circuit 300 may be viewed as having four complex multipliers (e.g., 340) that are representative of the Jones matrix. The complex multipliers multiply a time-varying 2×2 complex matrix by four input signals (e.g., 302) that each may be viewed as two complex signals, where the complex tap weights may be continuously adapted by using the above-mentioned LMS update equation to correct for the polarization and phase rotations in the optical channel.

In embodiments, adaption of the complex coefficients (e.g., 330) may be implemented by one analog LMS loop (e.g., 322) for each coefficient (e.g., 330). In embodiments, to correct for polarization and phase changes in the fiber, four real error slicers 310 monitor and compare the error, which may be a time-varying signal, to an ideal constellation and, based on the comparison, drive four complex adaption circuits (e.g., 320) that determine four complex coefficients (e.g., 330) for the Jones matrix. Supervisory control circuit 350 may be implemented by unitary forcer circuit 350. A suitable a unitary forcer circuit is disclosed in U.S. Patent Application No. 62/931,122 and in U.S. Patent Application No. 62/931,127, filed on Nov. 5, 2019, entitled "Dynamic Error Quantizer Tuning Systems and Methods," listing as inventors Charles Razzell.

1. Mathematical Description

It is noted that the mathematical concepts of complex LMS adaption that improves LMS convergence and related simplified equations herein are presented only for the purpose of providing a better understanding of the concepts of the present disclosure.

Considering a dual-polarization coherent optical receiver having four independent branches, XI, XQ, YI, and YQ, that represent the I- and Q-components of two arbitrary orthogonal polarizations X and Y, and neglecting losses and dispersion in the optical channel, the observed X- and Y-signals in the receiver branches may be represented in complex notation as $$\begin{bmatrix} X_{in} \\ Y_{in} \end{bmatrix} = e^{i\psi/2} \begin{bmatrix} e^{i\phi_1/2} & 0 \\ 0 & e^{-i\phi_1/2} \end{bmatrix} \begin{bmatrix} \cos\theta & \sin\theta \\ -\sin\theta & \cos\theta \end{bmatrix} \begin{bmatrix} e^{i\phi_0/2} & 0 \\ 0 & e^{-i\phi_0/2} \end{bmatrix} \begin{bmatrix} E_{xi} \\ E_{yi} \end{bmatrix},$$

where $\psi$, $\phi_1$, $\theta$, and $\phi_0$ are four real parameters; $\psi$ represents the absolute phase, $\phi_0$ represents relative phase shift between X- and Y-polarization signals before a plane polarization rotation by $\theta$; and $\phi_1$ represents the relative phase shift afterwards. By multiplying these sub-components, a single 2×2 complex matrix may be obtained that relates the received signal to the transmitted signal as follows:

$$\begin{bmatrix} X_{in} \\ Y_{in} \end{bmatrix} = \begin{bmatrix} \Gamma_{1X} & \Gamma_{1Y} \\ \Gamma_{2X} & \Gamma_{2Y} \end{bmatrix} \begin{bmatrix} E_{xi} \\ E_{yi} \end{bmatrix},$$

The matrix $\Gamma$ is unitary due to the factors that used to create it and is therefore invertible. An estimate of the original transmitted waveforms may be obtained as:

$$\begin{bmatrix} \hat{E}_{xi} \\ \hat{E}_{yi} \end{bmatrix} = \begin{bmatrix} \Gamma_{1X} & \Gamma_{1Y} \\ \Gamma_{2X} & \Gamma_{2Y} \end{bmatrix}^{-1} \begin{bmatrix} X_{in} \\ Y_{in} \end{bmatrix}.$$

Thus, there exists a new demixing matrix, $C \triangleq \Gamma^{-1}$, which may be substituted into the above matrix equation to yield $$\begin{bmatrix} X_{out} \\ Y_{out} \end{bmatrix} \stackrel{def}{=} \begin{bmatrix} \hat{E}_{xi} \\ \hat{E}_{yi} \end{bmatrix} = \begin{bmatrix} C_{1X} & C_{1Y} \\ C_{2X} & C_{2Y} \end{bmatrix} \begin{bmatrix} X_{in} \\ Y_{in} \end{bmatrix}.$$

This represents two linear equations, each having two complex coefficients, i.e., $$X_{out} = C_{1X}X_{in} + C_{1Y}Y_{in} \text{ and } Y_{out} = C_{2X}X_{in} + C_{2Y}Y_{in}.$$

Although the two equations look independent, they derive from only four independent real parameters and, hence, the coefficients in the top and bottom rows of the matrix are not independent from each other. Nevertheless, they may be treated as independent for the purposes of iterating towards a solution, as long as they do not converge in a manner such that the top and bottom rows are related to each other by some proportionality constant, i.e., $X_{out} = \alpha Y_{out}$, where $\alpha$ is the proportionality constant.

Solving one of these equations, and assuming that a similar technique may be applied to the other similar equation, provides $X_{out} = C_{1X}X_{in} + C_{1Y}Y_{in}$, in which only the observed signals $X_{in}$ and $Y_{in}$ are known. Although the estimated symbol $\hat{E}_{xi} = X_{out}$ is unknown, it is known that ideal samples of $X_{out}$ should be drawn from the finite alphabet of the modulation constellation in use, e.g., in 16-QAM modulation, which can be considered as 4-PAM signaling in each of the quadrature channels. Hence, for any candidate trial values of $C_{1X}$ and $C_{1Y}$, the error may be estimated as the difference between the nearest valid constellation point and the output signal $X_{out}$, denoted by $Q(X_{out})$ and $X_{out}$. Let $e(X_{out}) \triangleq Q(X_{out}) - X_{out}$. The quantizer, Q, may be defined as two 4-PAM modulation quantizers that operate, at least approximately, independently in the I- and Q-dimensions.

Based on the known complex LMS update equation, one may iterate towards a minimum error condition by accumulating into coefficients $C_{1X}$ and $C_{1Y}$ using the following update equations:

$$C_{1X} \Leftarrow C_{1X} + \mu(Q(X_{out}) - X_{out}) \times X_{in}^*$$

$$C_{1Y} \Leftarrow C_{1Y} + \mu(Q(X_{out}) - X_{out}) \times Y_{in}^*$$

$$X_{out} = X_{in} \times C_{1X} + Y_{in}C_{1Y}$$

Expanding the above complex expressions using $$X_{out} \stackrel{def}{=} X_{Iout} + iX_{Qout}; C_{1X} \stackrel{def}{=} C_{1XI} + iC_{1XQ}; C_{1Y} \stackrel{def}{=} C_{1YI} + iC_{1YQ}; \text{ and}$$

$$C_{2X} \stackrel{def}{=} C_{2XI} + iC_{2XQ}; C_{2Y} \stackrel{def}{=} C_{2YI} + iC_{2YQ}$$

yields for computation of the output for real and imaginary parts of the X-polarization output:

$$X_{Iout} = X_{Iin} \times C_{1XI} - X_{Qin} \times C_{1XQ} + Y_{Iin} \times C_{1YI} - Y_{Qin} \times C_{1YQ}$$

$$X_{Qout} = X_{Qin} \times C_{1XI} + X_{Iin} \times C_{1XQ} + Y_{Qin} \times C_{1YI} + Y_{Iin} \times C_{1YQ}.$$

The coefficient update equations for the real and imaginary parts of upper row of the coefficient matrix are then:

$$C_{1XI} \leftarrow C_{1XI} + \mu(Q(X_{Iout}) - X_{Iout}) \times X_{Iin} + \mu(Q(X_{Qout}) - X_{Qout}) \times X_{Qin}$$

$$C_{1XQ} \leftarrow C_{1XQ} + \mu(Q(X_{Qout}) - X_{Qout}) \times X_{Iin} - \mu(Q(X_{Iout}) - X_{Iout}) \times X_{Qin}$$

$$C_{1YI} \leftarrow C_{1YI} + \mu(Q(X_{Iout}) - X_{Iout}) \times Y_{Iin} + \mu(Q(X_{Qout}) - X_{Qout}) \times Y_{Qin}$$

$$C_{1YQ} \leftarrow C_{1YQ} + \mu(Q(X_{Qout}) - X_{Qout}) \times Y_{Iin} - \mu(Q(X_{Iout}) - X_{Iout}) \times Y_{Qin}$$

Similarly, one may write for the Y-polarization output:

$$Y_{out} = X_{in} \times C_2 + Y_{in} C_{2Y},$$

which expands to:

$$Y_{Iout} = X_{Iin} \times C_{2XI} - X_{Qin} \times C_{2XQ} + Y_{Iin} \times C_{2YI} - Y_{Qin} \times C_{2YQ}$$

$$Y_{Qout} = X_{Qin} \cdot C_{2XI} + X_{Iin} \cdot C_{2XQ} \cdot Y_{Qin} \cdot C_{2YI} + Y_{Iin} \cdot C_{2YQ}.$$

And the corresponding update equations are:

$$C_{2X} \leftarrow C_{2X} + \mu(Q(Y_{out}) - Y_{out}) \times X_{in}^*$$

$$C_{2Y} \leftarrow C_{2Y} + \mu(Q(Y_{out}) - Y_{out}) \times Y_{in}^*$$

which expand to:

$$C_{2XI} \leftarrow C_{2XI} + \mu(Q(Y_{Iout}) - Y_{Iout}) \times X_{Iin} + \mu(Q(Y_{Qout}) - Y_{Qout}) \times X_{Qin}$$

$$C_{2XQ} \leftarrow C_{2XQ} + \mu(Q(Y_{Qout}) - Y_{Qout}) \times X_{Iin} - \mu(Q(Y_{Iout}) - Y_{Iout}) \times X_{Qin}$$

$$C_{2YI} \leftarrow C_{2YI} + \mu(Q(Y_{Iout}) - Y_{Iout}) \times Y_{Iin} + \mu(Q(Y_{Qout}) - Y_{Qout}) \times Y_{Qin}$$

$$C_{2YQ} \leftarrow C_{2YQ} + \mu(Q(Y_{Qout}) - Y_{Qout}) \times Y_{Iin} - \mu(Q(Y_{Iout}) - Y_{Iout}) \times Y_{Qin}$$

The result is eight real-valued update equations that may be used to find the four complex coefficients of the demixing matrix. In embodiments of the present disclosure, these update equations may be implemented in the analog domain as continuous-time integrators.

a) Potential Simplification of LMS Update Equations

It is noted that each update equation maybe incremented by the sum of two products, according to a common standard complex LMS update equation. Some existing approaches neglect one of the above two products, which results in the following set of update equations:

$$C_{1XI} = C_{1XI} + \mu(Q(X_{Iout}) - X_{Iout}) \times X_{Iin} +$$

$$C_{1XQ} = C_{1XQ} + -\mu(Q(X_{Iout}) - X_{Iout}) \times X_{Qin}$$

$$C_{1YI} = C_{1YI} + +\mu(Q(X_{Qout}) - X_{Qout}) \times Y_{Qin}$$

$$C_{1YQ} = C_{1YQ} + \mu(Q(X_{Qout}) - X_{Qout}) \times Y_{Iin} -$$

etc.

Those deletions, combined with similar ones for the second pair of complex coefficients, yield the following eight update equations:

$$C_{1XI} = C_{1XI} + \mu(Q(X_{Iout}) - X_{Iout}) \times X_{Iin}$$

$$C_{1XQ} = C_{1XQ} - \mu(Q(X_{Iout}) - X_{Iout}) \times X_{Qin}$$

$$C_{1YI} = C_{1YI} + \mu(Q(X_{Qout}) - X_{Qout}) \times Y_{Qin}$$

$$C_{1YQ} = C_{1YQ} + \mu(Q(X_{Qout}) - X_{Qout}) \times Y_{Iin}$$

$$C_{2XI} = C_{2XI} + \mu(Q(Y_{Iout}) - Y_{Iout}) \times X_{Iin}$$

$$C_{2XQ} = C_{2XQ} - \mu(Q(Y_{Iout}) - Y_{Iout}) \times X_{Qin}$$

$$C_{2YI} = C_{2YI} + \mu(Q(Y_{Qout}) - Y_{Iout}) \times Y_{Qin}$$

$$C_{2YQ} = C_{2YQ} + \mu(Q(Y_{Qout}) - Y_{Qout}) \times Y_{Iin}$$

In embodiments, this results in saving one multiplication and one addition per complex tap compared to the conventional complex LMS update, at the cost of some adaption speed. The full set of equations relies on only four error terms, which are preferably computed only once each, hence the complexity reduction is indeed limited to one multiply and one add per coefficient.

These update equations are expressed in their discrete-time form, whereas the implementation should use continuous-time integrators of the terms on the right-hand-side.

Figure 4:
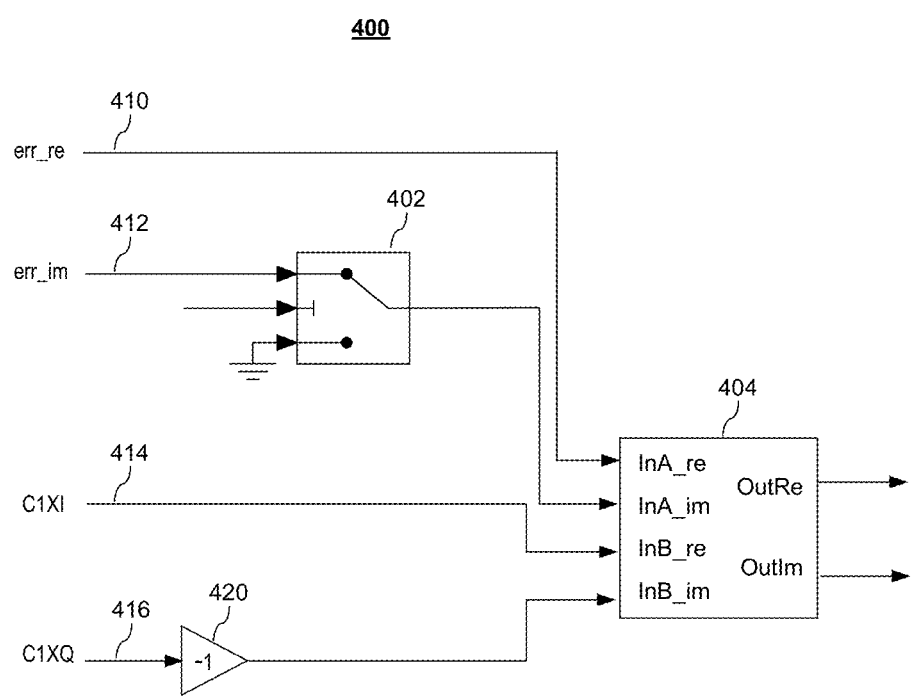
FIG. 4 illustrates an exemplary power-gated complex multiplier according to various embodiments of the present disclosure.

FIG. 4 illustrates an exemplary power-gated complex multiplier according to various embodiments of the present disclosure. As depicted in FIG. 4, complex multiplier 404 may be coupled to switch 402. A person of skill in the art will recognize that any type of transistor or switch may be employed, e.g., a GaN-type MOSFET or any other semiconductor device known in the art or developed in the future. One of skill in the art will further recognize that switch 402 may be driven by any type of control circuit (not shown).

In embodiments, power-gated complex multiplier 404 may be implemented in an LMS polarization tracking circuit, such as the tracking circuit shown in FIG. 3.

In operation, switch 402 in FIG. 4 may receive signal 412 that, in embodiments, may be representative of an imaginary component of an error signal and selectively output signal 412 to complex multiplier 404. In embodiments, the control circuit may automatically enable a transition between two or more operational states. For example, in a first mode of operation, the control circuit may adaptively cause switch 402 to automatically turn off signal 412 to avoid complex multiplier 404 from having to process, i.e., multiply, signal 412 with any other signal (e.g., 414).

In embodiments, the control circuit may activate or deactivate switch 402 in response to a switching condition that is defined by a signal that is indicative of a metric, e.g., a performance-related metric, such as an error vector magnitude, or a metric associated with the presence of a demand. A suitable metric may be derived from a set of direct or indirect measurements.

In embodiments, in response to a control signal satisfying a condition, such as a threshold, e.g., the imaginary part of the error signal being substantially zero, the controller may cause one or more multiplier circuits (e.g., 404) to be deactivated to avoid using signal 412, thereby greatly reducing power consumption. Conversely, in response to signal 412 not satisfying the condition, multiplier circuit(s) 404 may remain activated and process the imaginary part of the error signal.

Figure 5:
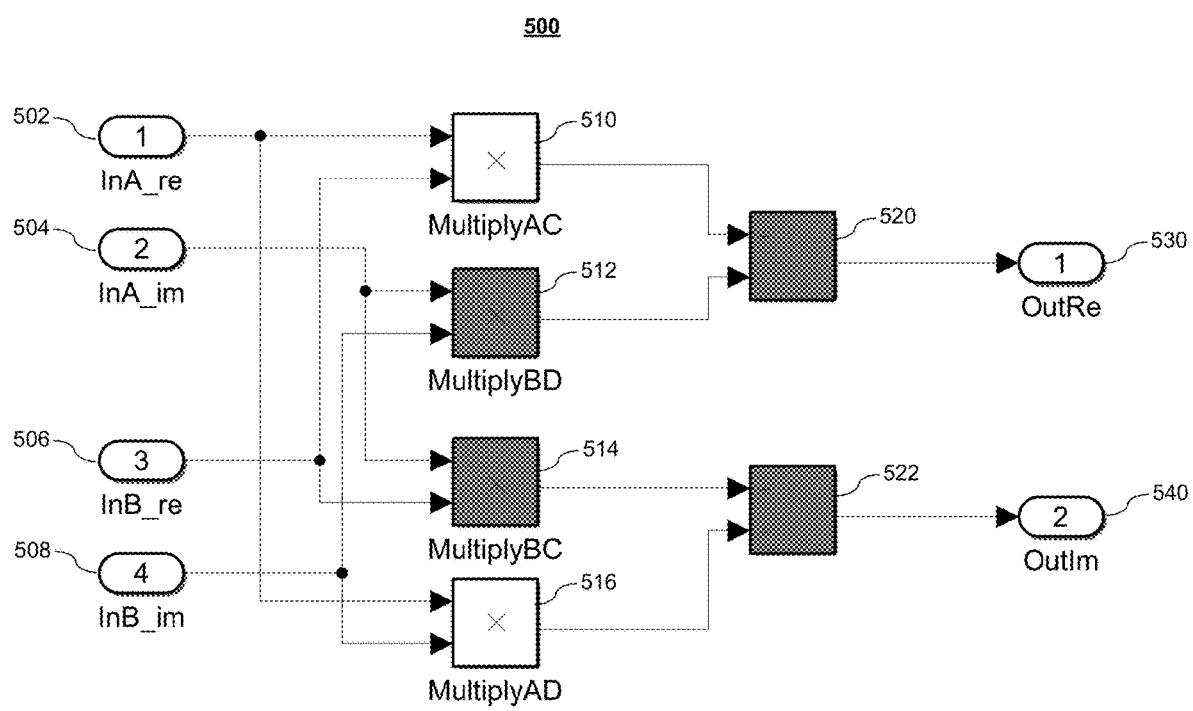
FIG. 5 illustrates power-gating in the complex multiplier in FIG. 4.

FIG. 5 illustrates an exemplary method for power-gating complex multipliers such as those shown in FIG. 4. In embodiments, complex multipliers 510-516 comprise inputs to receive complex signals 502-508 or components thereof, e.g., a real or imaginary component of a complex signal, such as a complex error signal.

In embodiments, some or all of signals 502-508 may be controlled by a set of switches (e.g., shown in FIG. 4) that controls whether a given complex multiplier 510-516 is used to perform an arithmetic operation.

In embodiments, complex multipliers 510-516 further comprise outputs that may be fed to summing circuits (e.g., 520) that may add the outputs of two or more complex multipliers 510-516. As depicted in FIG. 5, the real components of two complex signals 502 and 506 are multiplied by complex multiplier 510 and (selectively) added to the imaginary components of two complex signals 504, 508 that are multiplied by complex multiplier 512 to generate a real signal 530 that, in embodiments, is a complex signal.

In embodiments, a control circuit may be used to selectively deactivate complex multiplier 512 or one or more of its input signals (e.g., 504), such that the imaginary components of complex signals 504 and 508 are not added by summing circuit 520. As a result, complex multiplier 512 may conserve power by not having to process, i.e., multiply, one or more input signals. In embodiments, additional power may be conserved by deactivating summing circuit 520, 522.

Figure 6:
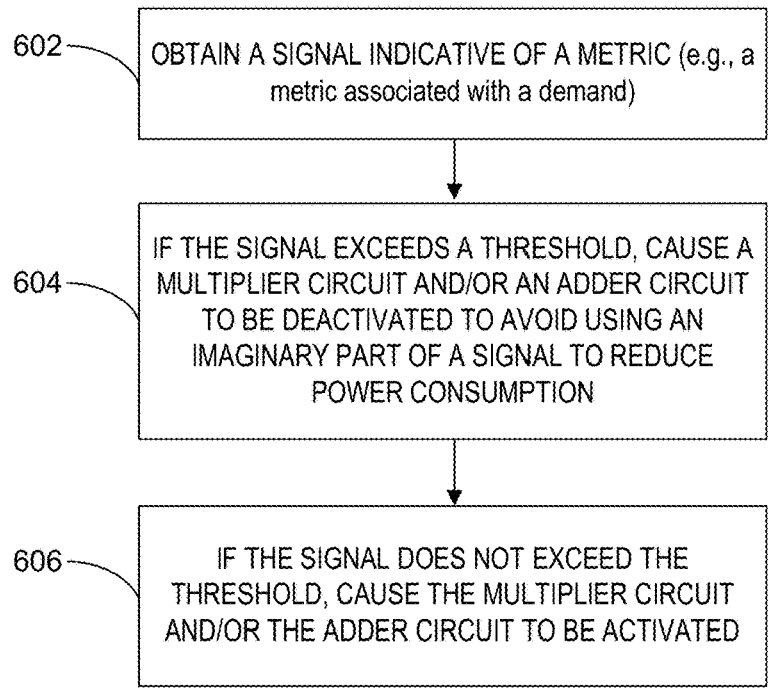
FIG. 6 is a flowchart of an illustrative process for reducing power in complex analog LMS adaptation circuits, according to embodiments of the present disclosure.

FIG. 6 is a flowchart of an illustrative process for reducing power in a complex analog LMS adaptation circuit, according to embodiments of the present disclosure. In embodiments, power saving process 600 may begin at step 602 when a signal that is indicative of a metric, e.g., a performance demand, is obtained.

At step 604, if the signal indicates that the signal exceeds a threshold, currents in at least one of a set of multiplier circuits and a set of adder circuits are caused to be turned off to reduce power consumption. In embodiments, the currents may be associated with an imaginary part of an error signal.

Otherwise, if the signal does not indicate that the signal exceeds the threshold, at step 606, the currents remain turned on or are caused to turn on. It is noted that certain steps may optionally be performed; steps may not be limited to the specific order set forth herein; certain steps may be performed in different orders; and certain steps may be done concurrently.

Aspects of the present disclosure may be encoded upon one or more non-transitory computer-readable media with instructions for one or more processors or processing units to cause various steps to be performed. It is noted that the one or more non-transitory computer-readable media shall include volatile and non-volatile memory. It shall be noted that alternative implementations are possible, including hardware implementations or software/hardware implementations. Hardware-implemented functions may be realized using Application Specific Integrated Circuits (ASICs), programmable arrays, digital signal processing circuitry, or the like. Accordingly, the terms in the claims are intended to cover both software and hardware implementations. The term "computer-readable medium or media" as used herein includes software and/or hardware having a program of instructions embodied thereon, or a combination thereof. With these implementation alternatives in mind, it is to be understood that the figures and accompanying description provide the functional information that one skilled in the art would require to write program code (i.e., software) and/or to create circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as code produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A power gating method to reduce power consumption in a complex least-mean-square (LMS) adaptation circuit, the method comprising:
   obtaining a signal that is indicative of a metric;
   in response of the signal exceeding a threshold, causing at least one of a set of multiplier circuits or a set of adder circuits to be deactivated to avoid using a quadrature component of a complex error signal to reduce power consumption; and
   in response of the signal not exceeding the threshold, causing the at least one of the set of multiplier circuits or the set of adder circuits to be activated to use the quadrature component of the complex error signal.

2. The method according to claim 1, wherein the metric is indicative of an imaginary part of the complex error signal being substantially zero.

3. The method according to claim 1, wherein the metric is related to a performance.

4. The method according to claim 3, wherein the metric is an error vector magnitude.

5. The method according to claim 3, wherein the metric is obtained from a set of measured values.

6. The method according to claim 1, wherein the metric is associated with a demand.

7. The method according to claim 1, wherein the set of multiplier circuits or the set of adder circuits are designed to process the quadrature component of the complex error signal.

8. The method according to claim 1, wherein, in response to the set of multiplier circuits being deactivated, the set of adder circuits are not used to add input signals.

9. A power-gated complex multiplier circuit comprising:
an input to receive at least a quadrature component of a complex signal, the input being selectively coupled to a switch that is controlled to power-gate at least part of the complex signal to cause the complex multiplier circuit to selectively not use the quadrature component of the complex signal to reduce power consumption; and
one or more outputs that selectively output a complex signal.

10. The power-gated complex multiplier circuit according to claim 9, wherein the one or more outputs are coupled to one or more adder circuits.

11. The power-gated complex multiplier circuit according to claim 9, wherein the complex signal is an error signal.

12. The power-gated complex multiplier circuit according to claim 9, wherein the switch is controlled by a signal that is indicative of a metric that has been obtained from a set of measured values.

13. The power-gated complex multiplier circuit according to claim 12, wherein the is wherein the metric is associated with a demand.

14. A complex LMS adaptation circuit comprising:
a set of complex multiplier circuits that receive at least a quadrature component of a complex signal;
a set of adder circuits coupled to the outputs of the set of complex multiplier circuits, the adder circuits selectively output a complex signal;
a set of switches coupled to the set of complex multiplier circuits; and
a controller coupled to control the set of switches, the controller selectively coupling the set of switches to power-gate at least part of the complex signal to cause at least some of the complex multiplier circuits to selectively not use the quadrature component of the complex signal to reduce power consumption.

15. The complex LMS adaptation circuit according to claim 14, wherein the complex multiplier circuits comprise a set of analog multiplier circuits.

16. The complex LMS adaptation circuit according to claim 15, wherein the set of analog multiplier circuits comprises a set of error slicers.

17. The complex LMS adaptation circuit according to claim 14, wherein the set of switches selectively turns on and off current sources in the complex multiplier circuits.

18. The complex LMS adaptation circuit according to claim 14, wherein at least some of the set of switches are controlled by a signal indicative of a metric.

19. The complex LMS adaptation circuit according to claim 18, wherein the metric is indicative of an imaginary part of the complex error signal being substantially zero.

20. The complex LMS adaptation circuit according to claim 14, wherein the complex signal is an error signal.

* * * * *